US010173491B2

United States Patent
Kim

(10) Patent No.: US 10,173,491 B2
(45) Date of Patent: Jan. 8, 2019

(54) HEAT PUMP SYSTEM FOR VEHICLE

(71) Applicant: Hyundai Motor Company, Seoul (KR)

(72) Inventor: Jae Yeon Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 149 days.

(21) Appl. No.: 15/353,646

(22) Filed: Nov. 16, 2016

(65) Prior Publication Data
US 2018/0072130 A1 Mar. 15, 2018

(30) Foreign Application Priority Data

Sep. 13, 2016 (KR) ........................ 10-2016-0118075

(51) Int. Cl.
*B60H 1/00* (2006.01)
*B60H 1/32* (2006.01)

(52) U.S. Cl.
CPC ..... *B60H 1/00278* (2013.01); *B60H 1/00007* (2013.01); *B60H 1/00921* (2013.01); *B60H 1/3205* (2013.01); *B60H 2001/00307* (2013.01); *B60H 2001/00928* (2013.01); *B60H 2001/00949* (2013.01)

(58) Field of Classification Search
CPC ............... B60H 1/00278; B60H 1/004; B60H 1/00007; B60H 1/00921; B60H 1/3205; B60H 2001/00307; B60H 2001/00928; B60H 2001/00949; B60L 11/1874; B60L 11/1875
See application file for complete search history.

(56) References Cited

U.S. PATENT DOCUMENTS

| | | | |
|---|---|---|---|
| 6,357,541 B1 | 3/2002 | Matsuda et al. |
| 6,705,101 B2 | 3/2004 | Brotz et al. |
| 7,147,071 B2 | 12/2006 | Gering et al. |
| 7,797,954 B2 | 9/2010 | Duhme et al. |
| 7,890,218 B2 | 2/2011 | Adams et al. |

(Continued)

FOREIGN PATENT DOCUMENTS

| | | | |
|---|---|---|---|
| JP | 2002-352866 A | 12/2002 |
| JP | 2010-114063 A | 5/2010 |

(Continued)

*Primary Examiner* — Frantz Jules
*Assistant Examiner* — Nelson Nieves
(74) *Attorney, Agent, or Firm* — Morgan, Lewis & Bockius LLP

(57) ABSTRACT

A heat pump system for a vehicle may include a battery cooling line connected to a battery module and allowing a coolant to flow therein, a chiller connected to the battery cooling line through a first connection line and connected to a refrigerant line of an air conditioner device in which a refrigerant moves through a second connection line to selectively heat-exchange a refrigerant and a coolant introduced to the inside thereof to adjust a temperature of the coolant, an electric/electronic component cooling device electric/electronic component cooling device including a radiator and a first water pump connected through a cooling line to circulate a coolant to cool a motor and an electric/ electronic component, and selectively connectable to the battery cooling line and the first connection line through a first valve, and an electronic expansion valve mounted at the second connection line between the refrigerant line and the chiller.

15 Claims, 4 Drawing Sheets

(56) References Cited

U.S. PATENT DOCUMENTS

| | | | |
|---|---|---|---|
| 7,975,757 B2 * | 7/2011 | Nemesh | B60H 1/00278 165/42 |
| 8,215,432 B2 | 7/2012 | Nemesh et al. | |
| 8,402,776 B2 * | 3/2013 | Johnston | B60L 3/0046 62/513 |
| 2009/0280395 A1 * | 11/2009 | Nemesh | B60H 1/00278 429/62 |
| 2011/0139397 A1 * | 6/2011 | Haussmann | B60H 1/00278 165/43 |
| 2013/0074525 A1 | 3/2013 | Johnston et al. | |
| 2013/0111932 A1 * | 5/2013 | Mishima | F25B 29/00 62/79 |
| 2013/0140001 A1 * | 6/2013 | Mandl | F28F 27/02 165/96 |
| 2013/0199217 A1 * | 8/2013 | Arai | B60H 1/00278 62/79 |
| 2013/0298583 A1 * | 11/2013 | O'Donnell | H01M 6/5038 62/115 |
| 2014/0033761 A1 | 2/2014 | Kawakami et al. | |
| 2014/0060102 A1 | 3/2014 | Nemesh et al. | |
| 2014/0216689 A1 | 8/2014 | Lombardo et al. | |
| 2014/0374060 A1 * | 12/2014 | Labaste Mauhe | B60H 1/00278 165/62 |
| 2015/0217623 A1 * | 8/2015 | Hatakeyama | B60L 1/003 165/42 |
| 2016/0221413 A1 * | 8/2016 | Gebbie | B60H 1/00921 |
| 2016/0351981 A1 * | 12/2016 | Porras | H01M 10/6569 |
| 2017/0021698 A1 * | 1/2017 | Hatakeyama | F25B 7/00 |
| 2017/0106725 A1 * | 4/2017 | Kim | B60H 1/00428 |
| 2017/0120718 A1 * | 5/2017 | Blatchley | B60H 1/00028 |
| 2017/0229746 A1 * | 8/2017 | Rawlinson | H01M 10/653 |
| 2017/0267056 A1 * | 9/2017 | Kim | B60H 1/00278 |
| 2017/0291470 A1 * | 10/2017 | Cheng | B60H 1/143 |

FOREIGN PATENT DOCUMENTS

| | | | |
|---|---|---|---|
| JP | 2012-017056 A | 1/2012 | |
| JP | WO 2015136768 A1 * | 9/2015 | F25B 7/00 |
| KR | 10-1294164 B1 | 8/2013 | |
| KR | 10-2016-0087001 A | 7/2016 | |
| KR | 10-2017-0008603 A | 1/2017 | |
| WO | WO 2012/013583 A1 | 2/2012 | |

* cited by examiner

HEAT PUMP SYSTEM FOR VEHICLE

CROSS-REFERENCE TO RELATED APPLICATION

The present application claims priority to and the benefit of Korean Patent Application No. 10-2016-0118075 filed on Sep. 13, 2016, the entire contents of which are incorporated herein by reference.

BACKGROUND OF THE INVENTION

Field of the Invention

The present invention relates to a heat pump system for a vehicle and, more particularly, to a heat pump system for a vehicle configured for cooling a battery module using a single chiller in which a refrigerant and a coolant are heat exchanged and enhancing heating efficiency using a waste heat source of a motor, an electric/electronic component, and a battery module.

Description of Related Art

In general, air-conditioning devices for a vehicle include an air-conditioner system circulating a refrigerant to heat or cool an indoor area of a vehicle.

Such an air conditioner device, maintaining an appropriate temperature in an indoor area of a vehicle, regardless of a change in an ambient temperature, to maintain an agreeable indoor environment, is configured such that a refrigerant discharged according to driving of a compressor circulates through a condenser, a receiver dryer, an expansion valve, an evaporator, and back to the compressor, and in this process, the indoor area of the vehicle is heated or cooled by heat-exchange based on the evaporator.

That is, in a cooling mode of in the air conditioner device in summer, a high-temperature, high-pressure gaseous refrigerant compressed by the compressor is condensed through the condenser and evaporated in the evaporator through the receiver dryer and the expansion valve to lower an indoor temperature and humidity.

Recently, as an interest in energy efficiency and environmental pollution problem is growing, development of eco-friendly vehicles (or green cars) that may substantially replace internal combustion engine vehicles is required, and such green cars are generally classified as an electric vehicle driven using a fuel cell or electricity as a power source and a hybrid vehicle driven using an engine and a battery.

Among the eco-friendly vehicles, an electric vehicle or a hybrid vehicle does not use a separate heater, unlike an air-conditioning device of a general vehicle, and an air-conditioning device applied to an eco-friendly vehicle is generally called a heat pump system.

In an electric vehicle, driving power is generated by converting chemical reaction energy of oxygen and hydrogen into electric energy, and in this process, thermal energy is generated due to a chemical reaction within a fuel cell, and thus, it is essential to effectively remove generated heat to secure performance of a fuel cell.

Also, in a hybrid vehicle, a motor is driven using a fuel cell or electricity supplied from an electric battery, together with an engine operated by general fuel, to generate driving power, and here, in order to secure performance of the motor, heat generated from the fuel cell, the battery, and the motor is required to be effectively removed.

Thus, in the related art hybrid vehicle or electric vehicle, a cooling device for an electric/electronic component, a heat pump system, and a battery cooling system are required to be configured as separate airtight circuits in order to prevent heating of a battery.

As a result, a size and weight of a cooling module disposed on a front side of a vehicle are increased, and a layout of connection pipes supplying a refrigerant or a coolant to the heat pump system, the cooling device for an electric/electric component, and the battery cooling system from the inside of an engine room is complicated.

Also, since the battery cooling system for warming up or cooling a battery is separately provided according to a state of a vehicle to allow a battery to exhibit optimal performance, a plurality of valves are applied to connect the connection pipes, and noise and vibrations due to frequent opening and closing operations of the valves are transmitted to an indoor area of a vehicle to degrade ride comfort.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a heat pump system for the vehicle, which is simplified by cooling a battery module using a single chiller in which a coolant and a refrigerant are heat-exchanged.

The present invention may have also been made in an effort to provide a heat pump system for the vehicle, having advantages of enhancing heat efficiency using a waste heat source of a motor, an electric/electronic component, and a battery module.

An exemplary embodiment of Various aspects of the present invention are directed to providing a heat pump system for a vehicle including: a battery cooling line connected to a battery module and allowing a coolant to flow therein; a chiller connected to the battery cooling line through a first connection line and connected to a refrigerant line of an air conditioner device in which a refrigerant moves through a second connection line to selectively heat-exchange a refrigerant and a coolant introduced to the inside thereof to adjust a temperature of the coolant; an electric/electronic component cooling device electric/electronic component cooling device including a radiator and a first water pump connected through a cooling line to circulate a coolant to cool a motor and an electric/electronic component, and selectively connectable to the battery cooling line and the first connection line through a first valve; and an electronic expansion valve provided in the second connection line between the refrigerant line and the chiller. The air conditioner device may include: an Heating, Ventilation, and Air Conditioning (HVAC) module connected through the refrigerant line and having an opening and closing door adjusting ambient air, which may have passed through an evaporator, to be selectively introducible to an internal condenser according to cooling, heating, and heating/dehumidification mode of the vehicle; a compressor connected through the refrigerant line between the evaporator and the internal condenser; an accumulator provided in the refrigerant line between the compressor and the evaporator; an external condenser connected to the internal condenser through the refrigerant line and positioned in a front of the vehicle; an expansion valve provided in the refrigerant line connecting the external condenser and the evaporator; and a waste heat recovery line connected to the refrigerant line between the external condenser and the expansion valve through a second valve provided in the refrigerant line between the internal condenser and the external condenser.

A third valve connecting the cooling line, which connects the motor and the electric/electronic component between the radiator and the chiller, and the battery cooling line may be provided in the battery cooling line.

When the battery module is cooled in the cooling mode of the vehicle, the first connection line may be opened and connected to the battery cooling line through an operation of the first valve, the second connection line may be opened through an operation of the electronic expansion valve, the refrigerant line connecting the external condenser and the evaporator may be opened through an operation of the expansion valve, the waste heat recovery line may be closed through an operation of the second valve, and the battery cooling line and the cooling line may form closed circuits, respectively, in a state in which the battery cooling line and the cooling line are not connected through operations of the first and third valves.

The electronic expansion valve may expand a refrigerant introduced in the second connection line and allow the expanded refrigerant to be introduced to the chiller.

When the battery module is cooled using a refrigerant in a state in which a cooling mode of the vehicle does not operate, the first and second connection lines may be opened through operations of the first valve and the electronic expansion valve, the electronic expansion valve may expand a refrigerant introduced in the second connection line and allow the expanded refrigerant to be introduced to the chiller, the expansion valve may be stopped in operation so the refrigerant line connected to the evaporator is closed, the waste heat recovery line may be closed through an operation of the second valve, and the battery cooling line and the cooling line may form closed circuits, respectively, in a state in which the battery cooling line and the cooling line are not connected through operations of the first and third valves.

When waste heat is recovered from the battery module, the motor, and the electric/electronic component in a heating mode of the vehicle, the first and second connection lines may be opened through operations of the first valve and the electronic expansion valve, the expansion valve is stopped in operation so the refrigerant line connected to the evaporator may be closed, the refrigerant line connected to the external condenser may be closed and the waste heat recovery line may be opened through an operation of the second valve, and the battery cooling line and the cooling line may be connected to form a single circuit through operations of the first and third valves.

The electronic expansion valve may expand a refrigerant introduced in the second connection line and allow the expanded refrigerant to be introduced to the chiller.

When waste heat is recovered from the battery mode, the motor, and the electric/electronic component in a heating mode of the vehicle, the chiller may be connected to the battery module, the motor, and the electric/electronic component in parallel through the first connection line.

The cooling line connecting the motor and the electric/electronic component may be selectively connectable to the first connection line through operations of the first valve and the second valve.

A reservoir tank may be provided in the cooling line between the radiator and the third valve.

A fourth valve may be provided in the first connection line between the first valve and the chiller.

The fourth valve may be a check valve.

The first, second, and third valves may be 3-way valves configured for distributing a flow rate A second water pump may be provided in the battery cooling line between the chiller and the battery module.

A heater may be provided in the battery cooling line between the battery module and the chiller.

The heater may be turned on when the battery module is warmed up, to heat a coolant circulated in the battery cooling line and allows the heated coolant to be introduced to the battery module.

The heater may be selectively turned on in a heating module to heat the coolant circulated in the battery cooling line.

As described above, in the heat pump system for a vehicle according to an exemplary embodiment of the present invention, since the battery module is cooled according to a mode of a vehicle using the single chiller in which a coolant and a refrigerant are heat-exchanged in an electric vehicle or a hybrid vehicle, a system may be simplified.

Also, since the battery module is cooled according to a mode of the vehicle, the battery module may exhibit optimal performance and an overall driving distance of the vehicle may be increased through effective management of the battery module.

In addition, heating efficiency may be enhanced by selectively using a waste heat source of the motor, the electric/electronic component, and the battery module.

Moreover, by minimizing the number of valves and simplifying an overall system, manufacturing cost may be reduced, a weight may be reduced, and space utilization may be enhanced.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
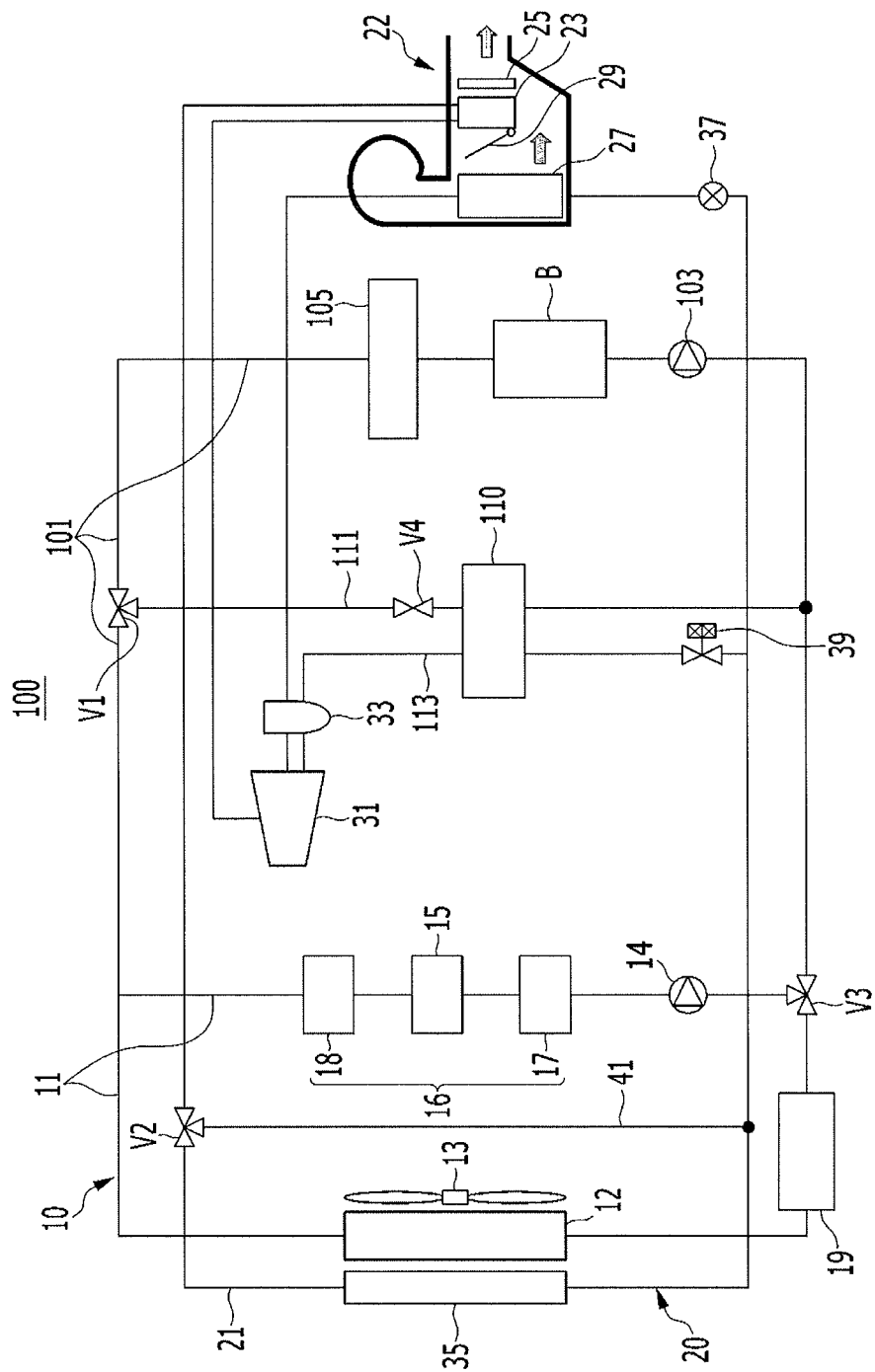
FIG. 1 is a block diagram of a heat pump system for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

The exemplary embodiment described in the present application and the configuration illustrated in the drawings are merely an exemplary embodiment of the present application, rather than representing all the technical concepts of the present application, so the present application is meant to cover all modifications, similarities and alternatives which are included in the spirit and scope of the present application at the time of filing of the present application.

In the accompanying drawings, a portion irrelevant to description of the present invention will be omitted for clarity, and like reference numerals refer to like elements throughout.

In the drawings, sizes and thickness of components are arbitrarily shown for the description purposes, so the present invention is not limited to the illustrations of the drawings and thicknesses are exaggerated to clearly express various parts and regions.

Throughout the specification, unless explicitly described to the contrary, the word "comprise" and variations such as "comprises" or "comprising", will be understood to imply the inclusion of stated elements but not the exclusion of any other elements.

The terms "unit", "means", "part", "member" and the like, described in the specification refer to units of comprehensive configuration performing at least one function or operation.

FIG. 1 is a block diagram of a heat pump system for a vehicle according to an exemplary embodiment of the present invention.

A heat pump system 100 according to an exemplary embodiment of the present invention enhances heating efficiency by cooling a battery module B mounted in the vehicle or selectively using waste heat generated by the battery module B or a motor 15 or an electric/electronic component 16.

As illustrated in FIG. 1, the heat pump system 100 interwork with an electric/electronic component cooling device 10 for cooling the motor 15 and the electric/electronic component 16 in a hybrid vehicle or an electric vehicle and an air conditioner device 20 as an air-conditioning device for cooling or heating an indoor area of a vehicle.

Here, the electric/electronic component cooling device 10 includes a radiator 12 and a first water pump 14 connected to a cooling line 11 and circulates a coolant to cool the motor 15 and the electric/electronic component 16.

The electric/electronic component 16 may include an electric power control unit (EPCU) provided in the cooling line 11 between the motor 15 and the first water pump 14 and an on-board charger (OBC) 18 provided in the cooling line 11 between the motor 15 and the radiator 12.

The radiator 12 is provided on a front side of a vehicle, a cooling fan 13 is provided on a rear side of the radiator 12, and a coolant is cooled through heat-exchange between an operation of the cooling fan 13 and ambient air.

The electric/electronic component cooling device 10 cools the motor 15 and the electric/electronic component 16 not to be overheated by circulating a coolant cooled by the radiator 12 through an operation of the first water pump 14 along the cooling line 11.

The air conditioner device 20 includes an Heating, Ventilation, and Air Conditioning (HVAC) module 22, a compressor 31, an accumulator 33, an external condenser 35, and an expansion valve 37 connected through a refrigerant line 21.

First, the HVAC module 22 is connected through the refrigerant line 21 and has an opening and closing door 29 adjusting ambient air, which has passed through an evaporator 27, to be selectively introducible to an internal condenser 23 and a heater 25 according to cooling, heating, and heating/dehumidification mode of the vehicle.

That is, in the heating mode of the vehicle, the opening and closing door 29 is opened to allow ambient air, which has passed through the evaporator 27, to be introduced to the internal condenser 23 and the heater 25. Conversely, in the cooling mode of the vehicle, the opening and closing door 29 closes the internal condenser 23 and the heater 25 such that ambient air which has been cooled, while passing through the evaporator 27, is directly introduced to an inside of the vehicle.

The compressor 31 is connected through the refrigerant line 21 between the evaporator 27 and the internal condenser 23. The compressor 31 compresses a refrigerant in a gaseous state.

The accumulator 33 is provided in the refrigerant line between the compressor 31 and the evaporator 27. The accumulator 33 supplies a refrigerant in a gaseous state to the compressor 31, thereby enhancing efficiency and durability of the compressor 31.

In the present exemplary embodiment, the external condenser 35 is connected to the internal condenser 27 through the refrigerant line 21. The external condenser 35 is positioned in a front of the radiator 12 for an electric/electronic component to heat-exchange a refrigerant introduced to an inside thereof with ambient air.

The expansion valve 37 is provided in the refrigerant line 21 connecting the external condenser 35 and the evaporator 27. The expansion valve 37 receives a refrigerant which has passed through the external condenser 35 and expands the received refrigerant.

Here, the heat pump system 100 according to an exemplary embodiment of the present invention further includes a battery cooling line 101, a chiller 110, and an electromagnetic expansion valve 39.

First, the battery cooling line 101 is connected to the battery module B and a coolant flows therein. The battery module B supplies power to the motor 15 and the electric/electronic component 16. The battery module B may be formed as a water cooling type cooled through a coolant.

Here, a second water pump 103 may be provided between the chiller 110 and the battery module B in the battery cooling line 101. The second water pump 103 operates to circulate a coolant through the battery cooling line 101.

The first water pump 14 and the second water pump 103 may be electric water pumps.

The chiller 110 is connected to the battery cooling line 101 through a first connection line 111 and connected to the refrigerant line 21 through a second connection line 113. The chiller 110 selectively heat-exchanges a refrigerant and a coolant introduced to an inside thereof to adjust a temperature of the coolant.

Here, the electric/electronic component cooling device 10 is selectively connectable to the battery cooling line 101 and the first connection line 111 through the first valve V1.

The first valve V1 selectively connects the cooling line 11 and the battery cooling line 101 or controls a movement flow of a coolant flowing through the coolant line 11 and the battery cooling line 101.

In the present exemplary embodiment, the electronic expansion valve 39 is provided in the second connection line 113 between the refrigerant line 21 and the chiller 110.

The electronic expansion valve 39 selectively opens and closes the second connection line 113 to allow a refrigerant to be introduced to the chiller 110. Also, when a refrigerant is required to be expanded, the electronic expansion valve 39 may operate to selectively expand the refrigerant according to a control signal from a controller.

The electronic expansion valve 39 may serve as a valve for circulating the refrigerant without expansion selectively according to a cooling or heating mode.

Thus, the electronic expansion valve 39 may be operated in a cooling mode of a vehicle or when the battery module B is cooled with a refrigerant. The electronic expansion valve 39 may expand a refrigerant introduced through the second connection line 113 to allow the expanded refrigerant in a low temperature (i.e., a temperature lower than a predetermined temperature) state to be introduced to the chiller 110.

That is, the electronic expansion valve 39 may expand a condensed refrigerant discharged from the condenser 35 and allow the refrigerant in a low temperature (i.e., a temperature lower than a predetermined temperature) state to be introduced to the chiller 110, whereby a water temperature of the coolant passing through an inside of the chiller 110 may be further lowered.

Thus, the coolant having a water temperature, which has been lowered while passing through the chiller 110, is introduced to the battery module B, cooling the battery module B.

In the present exemplary embodiment, the air conditioner device 20 further includes a waste heat recovery line 41 for recovering waste heat generated by the motor 15, the electric/electronic component 16, and the battery module B.

The waste heat recovery line 41 is connected to the refrigerant line 21 between the external condenser 35 and the expansion valve 37 through a second valve V2 provided in the refrigerant line 21 between the internal condenser 23 and the external condenser 35.

The waste heat recovery line 41 may be selectively opened through an operation of the second valve V2 in the heating mode of the vehicle.

Also, a third valve V3 is further provided in the battery cooling line 101.

The third valve V3 connects the cooling line 11, which connects the motor 15 and the electric/electronic component 16 between the radiator 12 and the chiller 110, and the battery cooling line 101.

That is, the cooling line 11 connecting the motor 15 and the electric/electronic component 16 may be selectively connectable to the first connection line 111 through operations of the first and third valves V1 and V3.

Also, a reservoir tank 19 may be provided in the cooling line 11 between the radiator 12 and the third valve V3.

A completely cooled coolant introduced from the radiator 12 may be stored in the reservoir tank 19.

In the present exemplary embodiment, it is described that the first water pump 14 is provided in the cooling line 11 between the third valve V3 and the EPCU 17, but the present invention is not limited thereto and the first water pump 14 may be provided in the cooling line 11 between the third valve V3 and the reservoir tank 19.

When the first water pump 14 is provided between the reservoir tank 19 and the third valve V3, when the battery module B is cooled by a coolant, the first water pump 14 may be actuated together with the second water pump 103 to increase a flow rate of the coolant circulated to the battery module B.

In the present exemplary embodiment, the first, second, and third valves V1, V2, and V3 may be 3-way valves configured for distributing a flow rate.

A fourth valve V4 may be provided in the first connection line 111 between the first valve V1 and the chiller 110.

The fourth valve V4 may be a check valve allowing a fluid to flow in a first direction.

The fourth valve V4 serves to prevent a coolant to flow backwards toward the first valve V1 from the chiller 110.

Also, a heater 105 may be provided in the battery cooling line 101 between the battery module B and the chiller 110.

Here, the heater 105 may be selectively turned on when the battery module B is warmed up, to heat a coolant circulated in the battery cooling line 101 and allow the heated coolant to be introduced to the battery module B.

Also, the heater 105 may be selectively turned on in the heating module of the vehicle to heat the coolant circulated in the battery cooling line 101.

Hereinafter, operations and effects of the heat pump system 100 according to an exemplary embodiment of the present invention in respective modes will be described in detail with reference to FIGS. 2 to 4.

First, an operation of the heat pump system 100 according to an exemplary embodiment of the present invention when the motor 15, the electric/electronic component 16, and the battery module B are cooled according to the cooling mode of the vehicle will be described with reference to FIG. 2.

Figure 2:
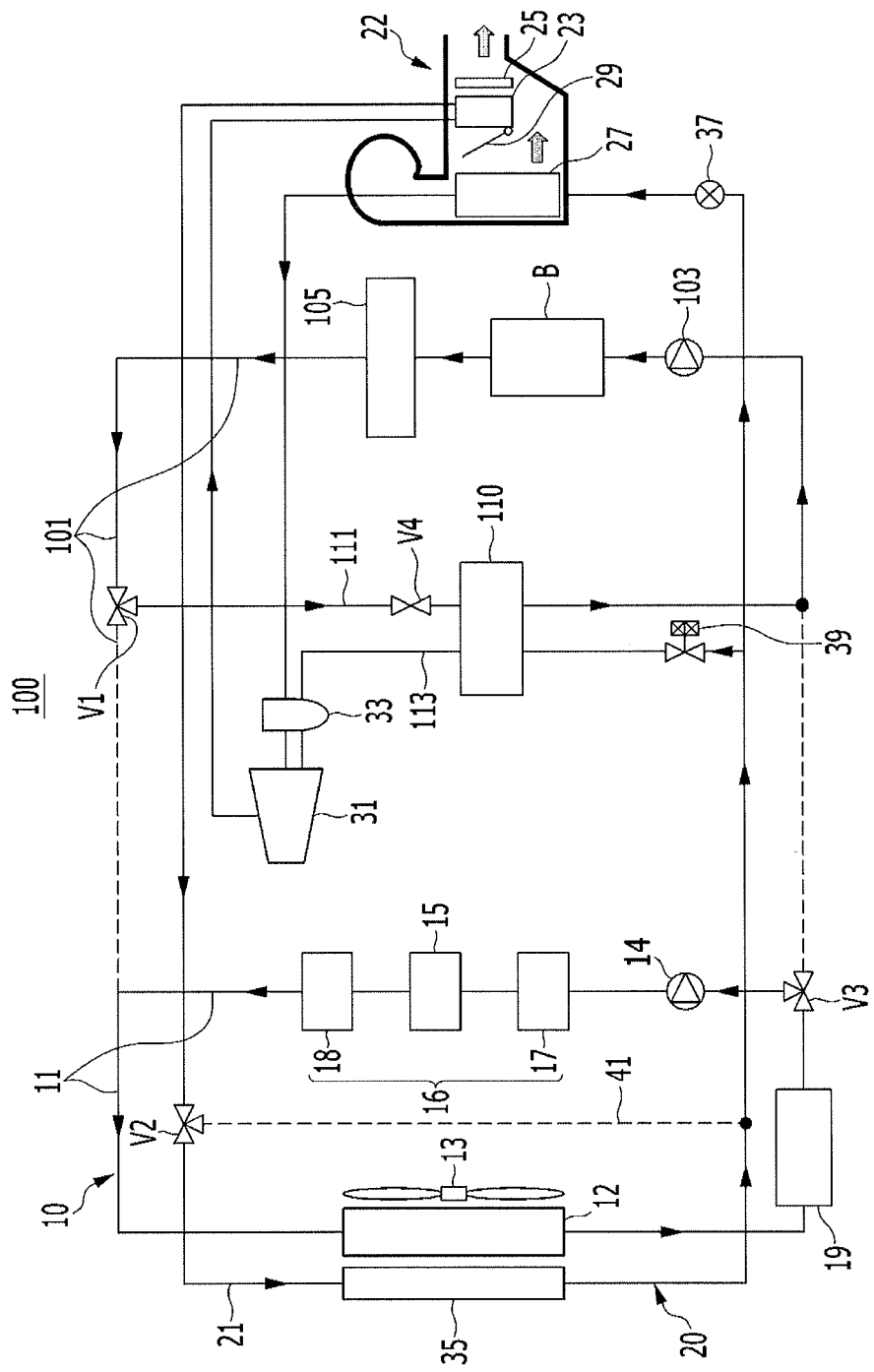
FIG. 2 is a view illustrating an operational state when a motor, an electric/electronic component, and a battery module are cooled according to a cooling mode of a vehicle in a heat pump system for a vehicle according to an exemplary embodiment of the present invention.

FIG. 2 is a view illustrating an operational state when a motor, an electric/electronic component, and a battery module are cooled according to a cooling mode of a vehicle in a heat pump system for a vehicle according to an exemplary embodiment of the present invention.

Referring to FIG. 2, in the case of cooling the battery module B in the cooling mode of the vehicle, in the electric/electronic component cooling device 10, the cooling line 11 is opened through an operation of the third valve V3 according to a cooling request from the motor 15 and the electric/electronic component 16 and a coolant temperature.

Simultaneously, the connection line 111 is opened to allow the battery module B and the chiller 110 to be connected through an operation of the first valve V1 in the battery cooling line 101.

Here, the cooling line 11 and the battery cooling line 101 are not connected through the operations of the first valve V1 and the third valve V3.

The cooling line 11 and the battery cooling line 101 then form closed circuits, respectively. Accordingly, a coolant flows independently along the closed circuits in the electric/electronic component cooling device 10 and the battery module B.

That is, the coolant cooled in the radiator 12 circulates the cooling line 11 to cool the motor 15 and the electric/electronic component 16 through an operation of the first water pump 14.

Also, the coolant passing through the chiller 110 circulates the battery cooling line 101 to cool the battery module B through an operation of the second fluid pump 103.

Here, the coolant circulating the battery cooling line 101 is cooled through heat-exchange with a refrigerant in the chiller 110 and supplied to the battery module B. Accordingly, the battery module B is cooled by the cooled coolant.

The air conditioner device 20 circulates a refrigerant along the refrigerant line 21 to cool the indoor area of the vehicle.

Here, the second connection line 113 is opened through an operation of the electronic expansion valve 39. Also, the waste heat recovery line 41 is closed through an operation of the second valve V2.

Accordingly, the chiller 110 may be connected to the evaporator 27 and the external condenser 35 in parallel.

A portion of the refrigerant discharged from the external condenser 35 is expanded through an operation of the electronic expansion valve 39 to have a low temperature (i.e., a temperature lower than a predetermined temperature) and low pressure (i.e., a pressure lower than a predetermined pressure), and thusly introduced to the chiller 110 connected to the second connection line 113.

That is, the electronic expansion valve 39 expands the refrigerant introduced to the second connection line 113 and allows the expanded refrigerant to be introduced to the chiller 110.

Thereafter, the refrigerant introduced to the chipper 110 is heat-exchanged with a coolant and introduced to the accumulator 33 through the second connection line 113.

That is, the coolant having a temperature increased while cooling the battery module B is heat-exchanged with the refrigerant having a low temperature and low pressure within the chiller 100 so as to be cooled. The cooled coolant is supplied again to the battery module B through the battery cooling line 101.

That is, as the aforementioned operation is repeatedly performed, the coolant may cool the battery module B.

Meanwhile, the other remaining refrigerant discharged from the external condenser 35 flows through the refrigerant line 21 to cool the indoor area of the vehicle, and sequentially passes through the expansion valve 37, the evaporator 27, the accumulator 33, the compressor 31, and the internal condenser 23.

Here, ambient air introduced to the HVAC module 22 is cooled, while passing through the evaporator 27, by the refrigerant having a low temperature introduced to the evaporator 27.

Here, the opening and closing door 29 closes a part leading to the internal condenser 23 to prevent cooled ambient air from passing through the internal condenser 23 and the heater 25. Thus, the cooled ambient air may be directly introduced to an inside of the vehicle to cool the indoor area of the vehicle.

Thereafter, the coolant is introduced to the external condenser 35 and heat-exchanged with ambient air, while passing through the external condenser 35, to be condensed.

That is, while the aforementioned process is repeatedly performed, the refrigerant cools the indoor area in the cooling mode of the vehicle, and cools the coolant through heat-exchanged therewith, while passing through the chiller 110.

An operation of the heat pump system when the battery module is cooled using a refrigerant in a state in which the cooling mode of the vehicle is paused will be described with reference to FIG. 3.

Figure 3:
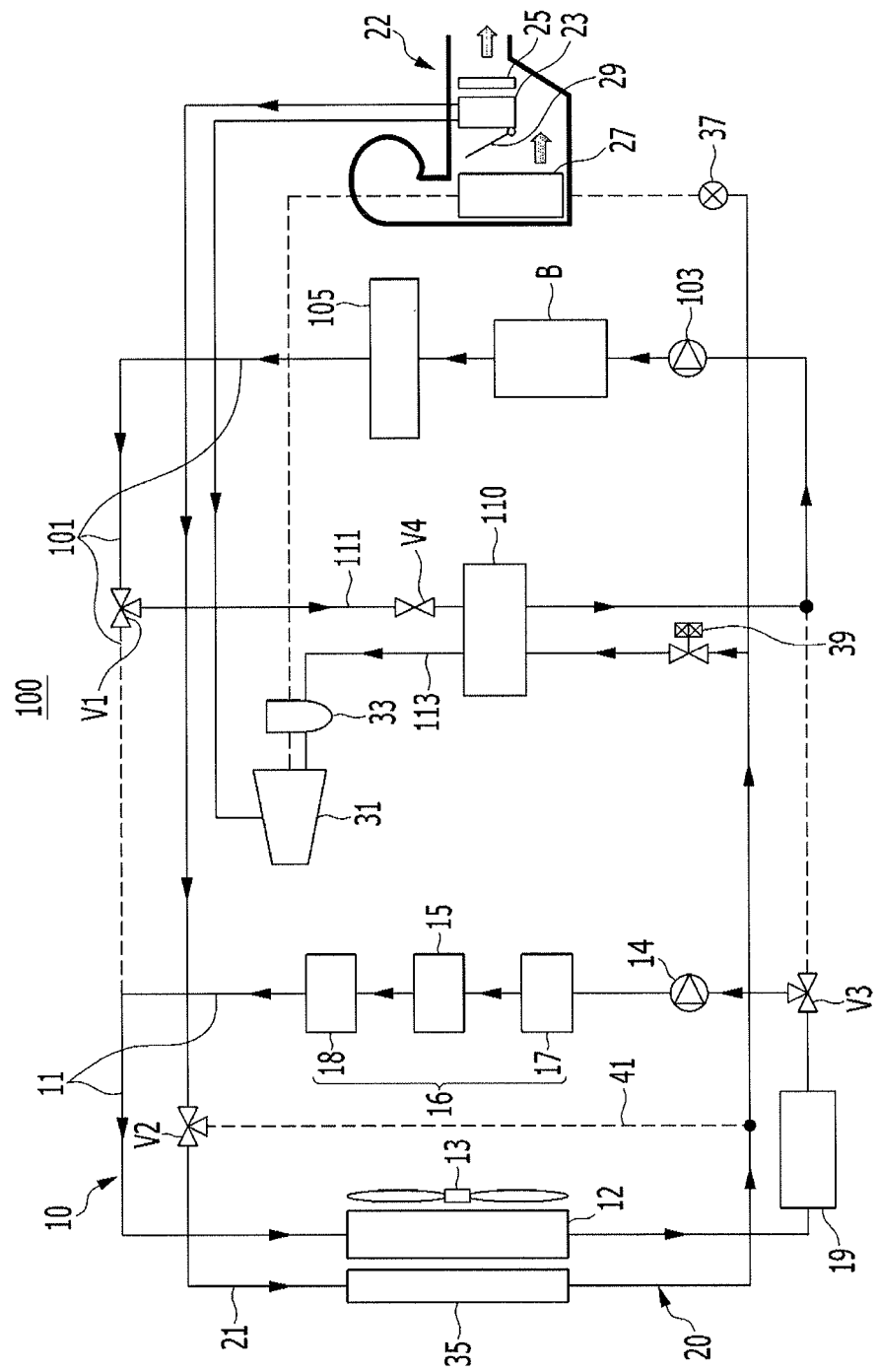
FIG. 3 is a view illustrating an operational state when a motor, an electric/electronic component, and a battery module are cooled in a state in which a cooling mode of a vehicle is paused in a heat pump system for a vehicle according to an exemplary embodiment of the present invention.

FIG. 3 is a view illustrating an operational state when a motor, an electric/electronic component, and a battery module are cooled in a state in which a cooling mode of a vehicle is paused in a heat pump system for a vehicle according to an exemplary embodiment of the present invention.

Referring to FIG. 3, in a case of cooling the battery module B using a refrigerant, the first and second connection lines 111 and 113 are opened through operations of the first valve V1 and the electronic expansion valve 39.

Simultaneously, the expansion valve 37 of the air conditioner device 20 is stopped in operation, and thus, an introduction of the refrigerant to the evaporator 27 is prevented.

Accordingly, the refrigerant is introduced from the compressor 31 to the external condenser 35 and condensed through heat-exchange with ambient air. Thereafter, the refrigerant is discharged from the external condenser and moves along the refrigerant line 21 to be introduced to the opened second connection line 113.

The refrigerant introduced to the second connection line 113 is expanded through an operation of the electronic expansion valve 39 to have a low temperature and low pressure, and thusly introduced to the chiller 110.

The refrigerant introduced to the chiller 110 is heat-exchanged with a coolant and introduced to the accumulator 33 through the second connection line 113.

That is, the coolant having a temperature increased while cooling the battery module B is heat-exchanged with the refrigerant having a low temperature and low pressure within the chiller 100 to be cooled. The cooled coolant is supplied again to the battery module B through the battery cooling line 101.

Thus, as the aforementioned operation is repeatedly performed, the coolant may cool the battery module B.

Meanwhile, the refrigerant, which has passed through the chiller 110, passes through the accumulator 33 and again sequentially passes through the compressor 31 and the internal condenser 23.

Thereafter, the coolant is introduced to the external condenser 35 and heat-exchanged with ambient air, while passing through the external condenser 35, to be condensed.

Here, the waste heat recovery line 41 is closed through an operation of the second valve V2.

Meanwhile, in the electric/electronic component cooling device 10, the cooling line 11 is opened through an operation of the third valve V3 according to a cooling request from the motor 15 and the electric/electronic component 16 and a coolant temperature.

Simultaneously, the connection line 111 is opened to allow the battery module B and the chiller 110 to be connected through an operation of the first valve V1 in the battery cooling line 101.

Here, the cooling line 11 and the battery cooling line 101 are not connected through the operations of the first valve V1 and the third valve V3.

The cooling line 11 and the battery cooling line 101 then form closed circuits, respectively. Accordingly, a coolant flows independently along the closed circuits in the electric/electronic component cooling device 10 and the battery module B.

That is, the coolant cooled in the radiator 12 circulates the cooling line 11 to cool the motor 15 and the electric/electronic component 16 through an operation of the first water pump 14.

Meanwhile, the coolant circulating the battery cooling line 101 is cooled through heat-exchange with the refrigerant in the chiller 110 and supplied to the battery module B. Accordingly, the battery module B is cooled by the coolant cooled through heat-exchange with the refrigerant.

That is, the coolant cooled through heat-exchange with the refrigerant in the chiller 135 is introduced to the battery module B through an operation of the second water pump 103. Accordingly, the cooled coolant may cool the battery module B.

In FIGS. FIG. 2 and FIG. 3, it is illustrated that the electric/electronic component cooling device 10 operates to cool the motor 15 and the electric/electronic component 16, but the present invention is not limited thereto and when the motor 15 and the electric/electronic component 16 are not required to be cooled, circulation of the coolant in the cooling line 11 may be stopped.

In the present exemplary embodiment, an operation when waste heat is recovered from the electric/electronic component and the battery module according to the heating mode of the vehicle will be described with reference to FIG. 4.

Figure 4:
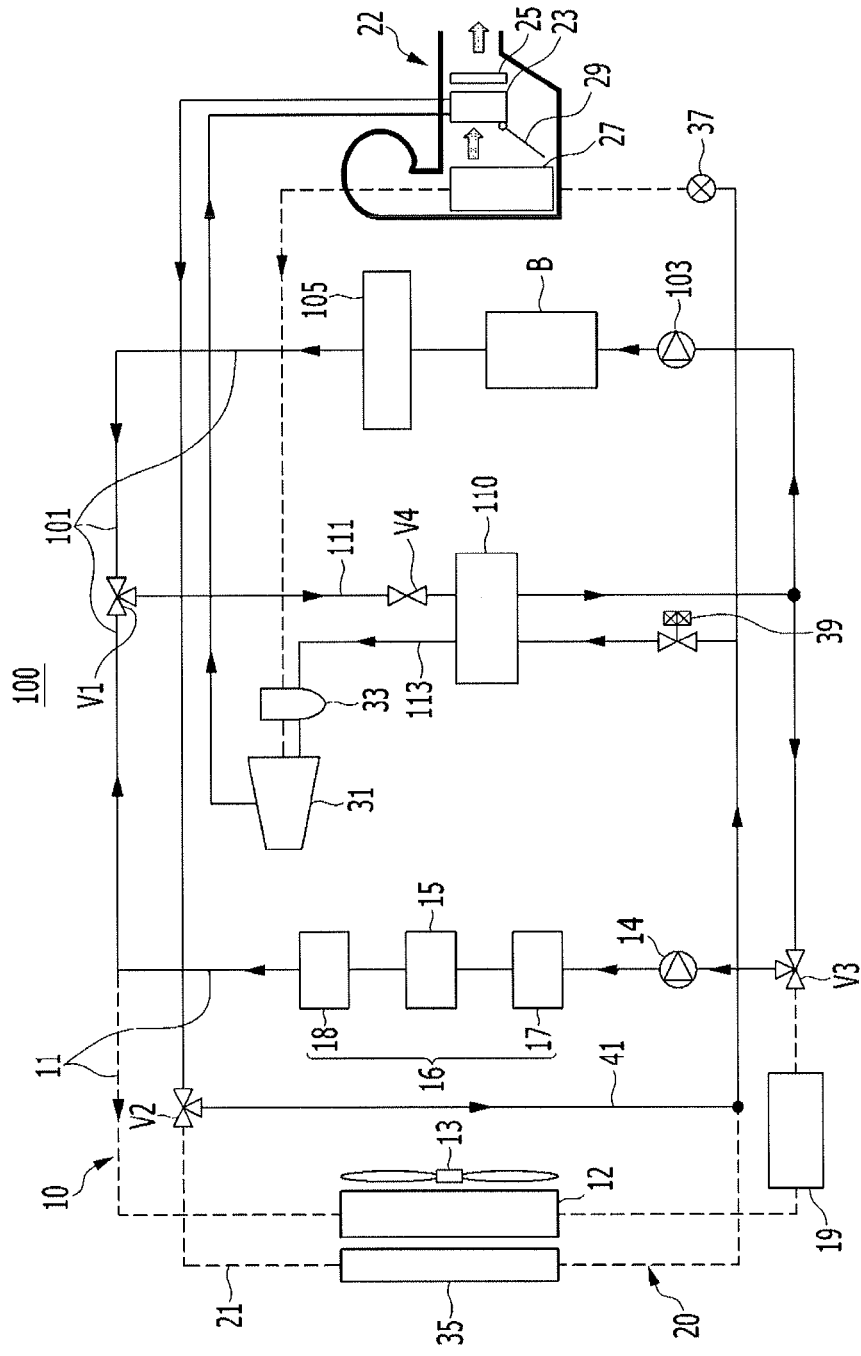
FIG. 4 is a view illustrating an operational state when waste heat is recovered from a motor, an electric/electronic component, and a battery module according to a heating mode of a vehicle in a heat pump system for a vehicle according to an exemplary embodiment of the present invention.

FIG. 4 is a view illustrating an operational state when waste heat is recovered from a motor, an electric/electronic component, and a battery module according to a heating mode of a vehicle in a heat pump system for a vehicle according to an exemplary embodiment of the present invention.

Referring to FIG. 4, in a case of recovering waste heat from the battery module B, the motor 5, and the electric/electronic component 16 in the heating mode of the vehicle, the first and second connection lines 1211 and 113 are opened through operations of the first valve V1 and the electronic expansion valve 39.

Also, the coolant line 21 connected to the external condenser 35 is closed and the waste heat recovery line 41 is opened through an operation of the second valve V2.

Here, the third valve V3 closes connection of the cooling line 11 such that the motor 15 and the electric/electronic component 16 are not connected to the radiator 12.

Simultaneously, the first and third valves V1 and V3 connect the cooling line 11 passing through the motor 15 and the electric/electronic component 16 to the battery cooling line 101.

Accordingly, the coolant having a temperature increased due to waste heat generated in the motor 15 and the electric/electronic component 16 and waste heat generated in the battery module B is introduced to the first connection line 111 through operations of the first and second water pumps 14 and 103 and passes through the chiller 110.

Here, the expansion valve 37 is stopped in operation and the refrigerant line 41 connected to the evaporator 27 is closed. Also, the electronic expansion valve 39 does not expand the refrigerant introduced in the second connection line 113 and allows the refrigerant to be introduced to the chiller 110.

That is, the electronic expansion valve 39 may operate as an opening and closing valve opening and closing the second connection line 113.

Thus, after passing through the chiller 110, the refrigerant sequentially passes through the accumulator 33, the compressor 31, and the internal condenser 23, and is introduced to the waste heat recovery line 41 opened through an operation of the second valve V2.

Thereafter, the refrigerant is introduced to the chiller 110 through the second connection line 113 and heat-exchanged with the coolant having an increased temperature in the chiller 110.

That is, the waste heat generated in the motor 15, the electric/electronic component 16, and the battery module B increases a temperature of the refrigerant in the chiller 110.

Here, the chiller 110 may be connected to the battery module B, the motor 15, and the electric/electronic component 16 in parallel through the first connection line 111.

The temperature-increased refrigerant passes through the accumulator 33, is introduced to the compressor 31, compressed to have a high temperature (i.e., a temperature higher than a predetermined temperature) and a high pressure (i.e., a pressure higher than a predetermined pressure) in the compressor 311, and introduced to the internal condenser 23.

Here, the opening and closing door 29 is opened to allow ambient air, which has been introduced to the HVAC module 22 and passed through the evaporator 27, to pass through the internal condenser 23.

Accordingly, the ambient air introduced from an outside is introduced in a state of room temperature without being cooled, when passing through the evaporator 27. The introduced ambient air is changed, while passing through the internal condenser 23, to have a high temperature, and introduced to the indoor area of the vehicle through the selectively operated heater 25, thus heating the indoor area of the vehicle.

Meanwhile, the heater 105 may be selectively turned on as necessary to heat a coolant circulated in the battery cooling line 101. Thus, the refrigerant passing through the chiller 110 may be rapidly increased in temperature.

That is, since the heat pump system 100 according to the present exemplary embodiment uses the waste heat source generated in the motor 16, the electric/electronic component 16, and the battery module B to increase a temperature of the refrigerant in the heating mode of the vehicle, power consumption of the compressor 31 may be reduced and heating efficiency may be enhanced.

Meanwhile, in the present exemplary embodiment, the case of recovering the waste heat from all the motor 15, the electric/electronic component 16, and the battery module B is described, but the present invention is not limited thereto. That is, when only waste of the battery module B is intended to be recovered, the cooling line 11 connecting the motor 15 and the electric/electronic component 16 may be selectively connectable to the first connection line 111 through operations of the first valve V1 and the second valve V2.

Thus, when the heat pump system 100 for a vehicle according to an exemplary embodiment of the present invention configured as described above is applied, the battery module B may be cooled according to a mode of a vehicle using the single chiller 110 in which a coolant and a refrigerant are heat-exchanged in an electric vehicle or a hybrid vehicle, and thus, a system may be simplified.

Also, since the battery module B is effectively cooled according to a mode of a vehicle, the battery module B may exhibit optimal performance and an overall driving distance of a vehicle may be increased through effective management of the battery module B.

In addition, heating efficiency may be enhanced by selectively using a waste heat source of the motor 15, the electric/electronic component 16, and the battery module B.

Moreover, through simplification of an overall system, manufacturing cost may be reduced, a weight may be reduced, and space utilization may be enhanced.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A heat pump system for a vehicle, the heat pump system comprising:
   a battery cooling line connected to a battery module and allowing a coolant to flow therein;
   a chiller connected to the battery cooling line through a first connection line and connected to a refrigerant line of an air conditioner device in which a refrigerant moves through a second connection line to selectively heat-exchange the refrigerant and the coolant introduced to an inside of the chiller to adjust a temperature of the coolant;
   an electric/electronic component cooling device including a radiator and a first water pump connected through a cooling line to circulate the coolant to cool a motor and an electric/electronic component, and selectively connectable to the battery cooling line and the first connection line through a first valve; and
   an electronic expansion valve mounted at the second connection line between the refrigerant line and the chiller,
   wherein the air conditioner device includes:
     an Heating, Ventilation, and Air Conditioning (HVAC) module connected through the refrigerant line and having an opening and closing door adjusting ambient air, which has passed through an evaporator, to be selectively introducible to an internal condenser according to cooling, heating, and heating/dehumidification modes of the vehicle;
     a compressor connected through the refrigerant line between the evaporator and the internal condenser;
     an accumulator mounted at the refrigerant line between the compressor and the evaporator;
     an external condenser connected to the internal condenser through the refrigerant line and positioned in a front of the vehicle;
     an expansion valve mounted at the refrigerant line connecting the external condenser and the evaporator; and
     a waste heat recovery line connected to the refrigerant line between the external condenser and the expansion valve through a second valve mounted at the refrigerant line between the internal condenser and the external condenser,
   wherein a third valve connecting the cooling line, which connects the motor and the electric/electronic component between the radiator and the chiller, is in the battery cooling line, and
   wherein
     when the battery module is cooled in the cooling mode of the vehicle,
     the first connection line is configured to be opened and connected to the battery cooling line through an operation of the first valve,
     the second connection line is configured to be opened through an operation of the electronic expansion valve,
     the refrigerant line connecting the external condenser and the evaporator is configured to be opened through an operation of the expansion valve,
     the waste heat recovery line is configured to be closed through an operation of the second valve, and
     the battery cooling line and the cooling line form closed circuits, respectively, in a state in which the battery cooling line and the cooling line are not connected through operations of the first and third valves.

2. The heat pump system of claim 1, wherein
   the electronic expansion valve expands the refrigerant introduced in the second connection line and allows the expanded refrigerant to be introduced to the chiller.

3. The heat pump system of claim 1, wherein
   when the battery module is cooled using the refrigerant in a state in which the cooling mode of the vehicle does not operate,
   the first and second connection lines are configured to be opened through operations of the first valve and the electronic expansion valve,
   the electronic expansion valve expands the refrigerant introduced in the second connection line and allows the expanded refrigerant to be introduced to the chiller,
   the expansion valve is configured to be stopped in operation so the refrigerant line connected to the evaporator is configured to be closed,
   the waste heat recovery line is configured to be closed through an operation of the second valve, and
   the battery cooling line and the cooling line form closed circuits, respectively, in a state in which the battery cooling line and the cooling line are not connected through operations of the first and third valves.

4. The heat pump system of claim 1, wherein
   when waste heat is recovered from the battery module, the motor, and the electric/electronic component in the heating mode of the vehicle,
   the first and second connection lines are configured to be opened through operations of the first valve and the electronic expansion valve,
   the expansion valve is configured to be stopped in operation so the refrigerant line connected to the evaporator is configured to be closed,
   the refrigerant line connected to the external condenser is configured to be closed and the waste heat recovery line is configured to be opened through an operation of the second valve, and
   the battery cooling line and the cooling line are connected to form a single circuit through operations of the first and third valves.

5. The heat pump system of claim 4, wherein
   the electronic expansion valve expands the refrigerant introduced in the second connection line and allows the expanded refrigerant to he introduced to the chiller.

6. The heat pump system of claim 5, wherein
When the waste heat is recovered from the battery module, the motor, and the electric/electronic component in the heating mode of the vehicle,
the chiller is connected to the battery module, the motor, and the electric/electronic component in parallel through the first connection line.

7. The heat pump system of claim 5, wherein
the cooling line connecting the motor and the electric/electronic component is selectively connectable to the first connection line through operations of the first valve and the second valve.

8. The heat pump system of claim 1, wherein
a reservoir tank is mounted at the cooling line between the radiator and the third valve.

9. The heat pump system of claim 8, wherein
a fourth valve is mounted at the first connection line between the first valve and the chiller.

10. The heat pump system of claim 9, wherein
the fourth valve is a check valve.

11. The heat pump system of claim 1, wherein
the first, second, and third valves are 3-way valves configured for distributing a flow rate.

12. The heat pump system of claim 1, wherein
a second water pump is mounted at the battery cooling line between the chiller and the battery module.

13. The heat pump system of claim 1, wherein
a heater is mounted at the battery cooling line between the battery module and the chiller.

14. The heat pump system of claim 13, wherein
the heater is configured to be turned on when the battery module is warmed up, to heat the coolant circulated in the battery cooling line and allows the heated coolant to be introduced to the battery module.

15. The heat pump system of claim 13, wherein
the heater is configured to be selectively turned on in the heating mode to heat the coolant circulated in the battery cooling line.

\* \* \* \* \*